March 30, 1948. M. RACHLIN Re. 22,992

METHOD OF MAKING DOWNSPOUT HOOKS AND ARTICLES FORMED THEREBY

Original Filed May 5, 1941

Inventor
Maurice Rachlin,

By Oberlin Limbach & Day
Attorneys

Reissued Mar. 30, 1948

Re. 22,992

UNITED STATES PATENT OFFICE 22,992

METHOD OF MAKING DOWNSPOUT HOOKS AND ARTICLES FORMED THEREBY

Maurice Rachlin, Brooklyn, N. Y., assignor to Max Rachlin, Flushing, N. Y.

Original No. 2,365,971, dated December 26, 1944, Serial No. 392,002, May 5, 1941. Application for reissue August 7, 1947, Serial No. 767,146

6 Claims. (Cl. 248—71)

This invention relates as indicated to a method of making a downspout hook and article formed thereby. It is the object of the invention to make a hook from wire as distinguished from sheet metal and cast hooks, said wire having any desired cross-sectional configuration.

It is another object of the invention to eliminate any twist action during the formation of the hook, since such twisting has a tendency to weaken the hook.

It is also an object to provide a downspout hook made from wire which possesses greater strength than the strength of the wire initially and one which is not damaged by hammering. It is, of course, to be understood that the hook of the present invention is inserted in wood, mortar or masonry by a hammering operation.

It is a specific object of the invention to provide a downspout hook with a pipe engaging part hereinafter termed hook portion, which is spaced radially inwardly from a driving tang or shank. The hook portion is normally made in the form of a semi-circle and, in the present instance, the driving portion is designed to extend radially outward from one end of the hook portion and from the outer end of the driving portion. The driving tang is connected to the other end of the driving portion which places the driving tang in spaced relationship to one end of the hook portion. The object of this construction is to provide a downspout hook in which the hammering, incident to installation, tightens the grip of the hook portion on the pipe instead of loosening it.

It is another object of the invention to provide a hook portion which has a flat surface and which is reinforced by an exterior, upstanding rib, thus insuring a permanent configuration.

It is a still further object of the invention to materially strengthen the driving head in the downspout hook or, stated in other words, to strengthen the part of the downspout hook which receives the blows of a hammer when the hook is being installed.

While downspout hooks formed with wire are old, no one, as far as I am aware, has provided a driving tang flattened in one direction and a hook portion flattened in a direction substantially at right angles to the direction in which the driving tang is flattened. The downspout hook of the present invention is adapted to be employed with downspouts of various cross-section, such as circular, rectangular and hexagonal, or any other particular shape.

To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of the various mechanical forms in which the principle of the invention may be used.

Figure 1:
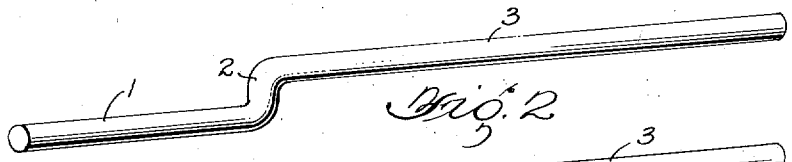
Figure 1 is a perspective view of a piece of wire.

Referring now to the drawing and more especially Figure 1, it will be seen that the downspout hook of the present invention in its initial form, comprises a length of wire. This length of wire is bent so as to have an end portion 1, connecting portion 2 and another end portion 3, which is somewhat longer than the portion 1. The connecting portion 2 extends at right angles to the portions 1 and 3 so that the portions 1 and 3 may be said to be spaced and extending in parallel planes. The reason for this specific configuration will become apparent as the description proceeds.

Figure 2:
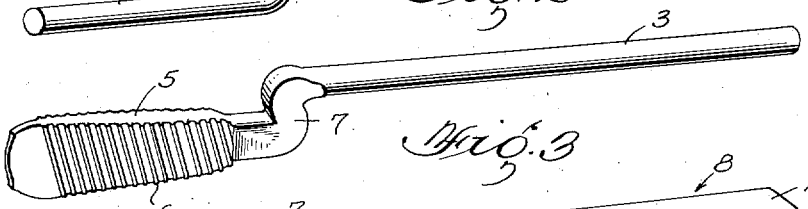
Figure 2 is a perspective view after one end of the wire has been flattened.

The blank shown in Figure 1 is formed by cutting a length of wire from a relatively long piece of wire and imparting the bend 2 at the same time that the blank is severed from the major portion. The blank is then flattened between dies or other members to form the enlarged terminal portion 5 and, at the time of flattening, such terminal portion is provided with serrations 6 which prevent withdrawal of the driving portion when inserted in mortar or wood. The flattening operation takes place with respect to portions 1 and 2 and results in flattened parts 5 and 7. The blank now has the shape shown in Figure 2.

Figure 3:
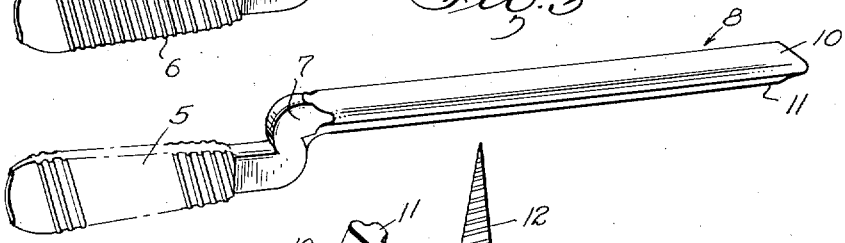
Figure 3 is a perspective view after the opposite end has been pressed.
Figure 8:
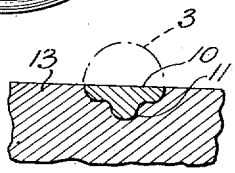
Figure 8 is a sectional view illustrating the hook portion of my downspout hook in one of the forming dies.

The blank is then rotated through an arc of 90 degrees and pressure is applied to the same in the die 13 so as to provide the cross-sectional shape shown in Figure 8. This particular shape results in a flat gutter engaging surface 10 and an outstanding reinforcing rib 11. The blank, at this time, still comprises three parts generally indicated at 5, 7 and 8 and has the shape shown in Figure 3.

Figure 4:
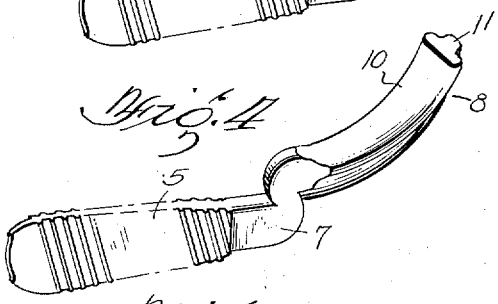
Figure 4 is a partial perspective view.
Figure 5:
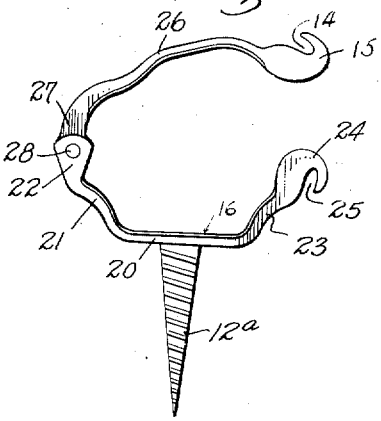
Figure 5 is a plan view showing the completed article in one form.

In the next operation, the portion 8 is bent into substantially the form of a semi-circle not being shown in Figure 4 since space does not permit a full showing, as it will be obvious to anyone, that the portion 8 continues around in the manner shown in Figure 5.

The next operation comprises trimming the portion 5 to form the pointed driving tang 12 as shown in Figure 5. It will be especially noted that the driving tang has its axis somewhat spaced from the end of the hook portion 8 so that hammer blows upon the driving head 7 are imparted directly to the driving tang and will never draw the hook portion 8 away from the downspout.

Figure 6:
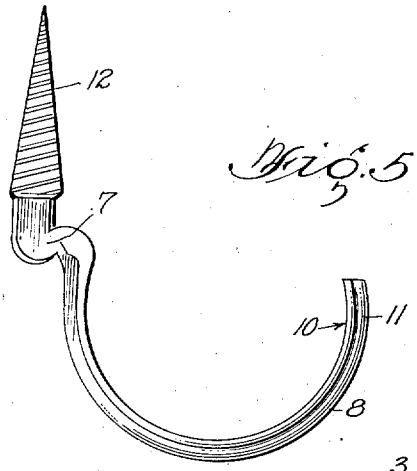
Figure 6 is a plan view of a modification.

In Figure 6, I have shown a downspout hook formed from wire, this hook being designed to embrace an oval or hexagonal downspout. In this embodiment, the wire has flattened terminal portions 22 and 24 connected by pressed intermediate portions 21, 20 and 23, of which the portion 20 defines a base, and the portions 21 and 23 arms extending outwardly from the base. The cross-section of these intermediate portions is shown in Figure 8, that is, they comprise a flat downspout engaging surface and an outstanding reinforcing rib. An arm 26 of similar configuration is pivoted at 28 to the flattened portion 22 and this arm is adapted to be drawn down so as to snugly engage the downspout. It is then secured to the flattened portion 24 by wires encircling the grooves 14 and 25 or by any other desired means. The driving tang **12*a* is welded to the portion 20 and since the surface 16** is flat, the downspout hook may be readily driven into place.

Figure 7:
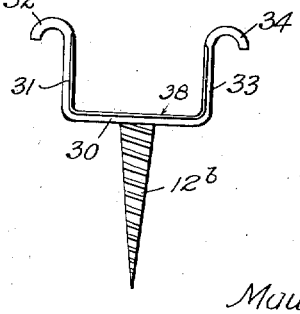
Figure 7 is a plan view of a modification.

In Figure 7, I have shown a downspout hook adapted to receive a rectangular downspout. In this case the hook portion comprises the base 30, arms 31 and 33 extending outwardly therefrom and provided with flattened terminal portions 32 and 34. The driving tang **12*b* is welded to the central portion of the rib on the base 30 and since the surface 38 is flat, the downspout hook may be easily driven into place. In this modification, the downspout hook is retained in place by wires or other means encircling the terminal portions 32 and 34**.

In the modification shown in Figures 6 and 7, the driving tangs **12*a* and 12*b*** are formed by flattening wire after which or during which serrations will be formed in the flattened surfaces to retain the tang in place.

From the preceding description, it will be seen that I have provided a downspout hook which is composed entirely of wire as distinguished from a castiing or sheet metal hook. It will also be seen that no twisting takes place during the course of making my hook since such twisting tends to weaken the final product. The hook that I have provided, will be seen to be strengthened during the course of manufacture since flattening and pressing of the wire will have a tendency to strengthen the hook. It is to be particularly observed that the driving tang is spaced radially outward from the hook portion in the preferred embodiment or type adapted to be used with circular downspouts. This is of great importance because all blows received by the driving head 7 are transmitted directly to the driving tang with no ill effect upon the hook portion 8. If any effect occurs with respect to the hook portion, this will be advantageous because the hook will be forced snugly against the downspout. In addition to the foregoing, it will be seen that the hook portion, whether it be circular, hexagonal or rectangular, is strengthened by the provision of a reinforcing rib so that the same will permanently retain its shape.

Other modes of applying the principles of my invention may be employed instead of the one explained, change being made as regards the means and the steps herein disclosed, provided those stated by any of the following claims or their equivalent be employed.

I therefore particularly point out and distinctly claim as my invention:

1. A method of making a downspout hook, which comprises the steps of imparting a bend to a straight piece of wire, to form a blank consisting of two spaced parts, extending in substantially parallel planes, joined by a third connecting part, extending substantially at right angles to both of said spaced parts, then flattening one of said spaced parts and said connecting part and then pressing said other spaced part in a direction at right angles to the direction in which said first spaced part and said connecting part were flattened.

2. A method of making a downspout hook, which comprises the steps of imparting a bend to a straight piece of wire, to form a blank consisting of two spaced parts, extending in substantially parallel planes, joined by a third connecting part, extending substantially at right angles to both of said spaced parts, then flattening one of said spaced parts and said connecting part and then pressing said other spaced part in a direction at right angles to the direction in which said first spaced part and said connecting part were flattened, then bending such pressed part into substantially a semi-circle.

3. A method of making a downspout hook, which comprises the steps of imparting a bend to a straight piece of wire, to form a blank consisting of two spaced parts, extending in substantially parallel planes, joined by a third connecting part, extending substantially at right angles to both of said spaced parts, then flattening one of said spaced parts and said connecting part and then pressing said other spaced part in a direction at right angles to the direction in which said first spaced part and said connecting part were flattened, then bending such pressed part into substantially a semi-circle, then trimming such flattened spaced part to form a driving tang.

4. A downspout hook cold worked from wire stock, comprising a driving tang formed of flattened metal stock and a hook portion formed of the same stock, said hook portion having a plane inner face and a reinforced permanent configuration and that portion of said downspout hook where the tang merges into the hook portion being laterally offset from the hook portion to provide a driving head in longitudinal alinement with the tang, said tang being widened between the free end and the driving end.

5. A downspout hook comprising a driving tang formed of flattened metal stock and a hook portion formed of the same stock, said hook portion having a plane inner face and a reinforced permanent configuration and that portion of said downspout hook where the tang merges into the hook portion being flattened in a plane at right angles to the plane of the inner face of said hook, said tang being widened between the free end and the driving end, said driving tang being provided with substantially transverse retaining serrations.

6. A downspout hook cold worked from wire stock, comprising a driving tank formed of flattened metal stock and a hook portion formed of the same stock; said hook portion having a plane inner face and a reinforced permanent configuration with the tang located substantially centrally of the hook portion, the hook portion providing a driving head in longitudinal alinement with the tang, said tang being widened between the free end and the driving end.

MAURICE RACHLIN.

REFERENCES CITED

The following references are of record in the file of this patent:

UNITED STATES PATENTS

| Number | Name | Date |
|---|---|---|
| 327,279 | Leadley | Sept. 29, 1885 |
| 1,109,568 | Flagge | Sept. 1, 1914 |
| 1,476,764 | Morhoff et al. | Dec. 11, 1923 |
| 1,587,143 | Buckley | June 1, 1926 |
| 1,711,240 | Merryweather | Apr. 30, 1929 |
| 1,888,265 | Guthrie | Nov. 22, 1932 |

FOREIGN PATENTS

| Number | Country | Date |
|---|---|---|
| 2,195 | Great Britain | 1914 |
| 8,349 | Great Britain | 1887 |
| 251,013 | Great Britain | Apr. 21, 1926 |